(12) United States Patent
Clarberg et al.

(10) Patent No.: US 10,074,213 B2
(45) Date of Patent: Sep. 11, 2018

(54) ADAPTIVE MULTI-FREQUENCY SHADING

(71) Applicant: Intel Corporation, Santa Clara, CA (US)

(72) Inventors: Franz P. Clarberg, Lund (SE); Tomas G. Akenine-Moller, Lund (SE); Robert M. Toth, Lund (SE); Carl J. Munkberg, Malmo (SE)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 14/227,045

(22) Filed: Mar. 27, 2014

(65) Prior Publication Data

US 2015/0070355 A1 Mar. 12, 2015

Related U.S. Application Data

(60) Provisional application No. 61/876,887, filed on Sep. 12, 2013.

(51) Int. Cl.
*G06T 15/80* (2011.01)
*G06T 15/00* (2011.01)

(52) U.S. Cl.
CPC ............ *G06T 15/80* (2013.01); *G06T 15/005* (2013.01)

(58) Field of Classification Search
None
See application file for complete search history.

(56) References Cited

PUBLICATIONS

Liktor G, Dachsbacher C. Decoupled Deferred Shading on the GPU. GPU Pro 4: Advanced Rendering Techniques. Apr. 26, 2013;4:81.*
Burns, C.A., et al., "A lazy object-space shading architecture for decoupled sampling," published in High Performance Graphics, 2010 (10 pages).
Clarberg, P., et al., "A sort-based deferred shading architecture for decoupled sampling," published in ACM Transactions on Graphics (Proceedings of SIGGRAPH), vol. 32 (4), 2013 (10 pages).
Djeu, P., et al., "Razor: An architecture for dynamic multiresolution ray tracing," published in ACM Transactions on Graphics, vol. 30 (5), 2011 (26 pages).

(Continued)

*Primary Examiner* — Zhengxi Liu
(74) *Attorney, Agent, or Firm* — Trop Pruner & Hu, P.C.

(57) ABSTRACT

An architecture for pixel shading, enables flexible control of shading rates and automatic shading reuse between triangles in tessellated primitives in some embodiments. The cost of pixel shading may then be decoupled from the geometric complexity. Wider use of tessellation and fine geometry may be made more feasible, even at very limited power budgets. Shading may be done over small local grids in parametric patch space, with reusing of shading for nearby samples. The decomposition of shaders into multiple parts is supported, which parts are shaded at different frequencies. Shading rates can be locally and adaptively controlled, in order to direct the computations to visually important areas and to provide performance scaling with a graceful degradation of quality. Another important benefit, in some embodiments, of shading in patch space is that it allows efficient rendering of distribution effects, which further closes the gap between real-time and offline rendering.

22 Claims, 8 Drawing Sheets

(56) References Cited

PUBLICATIONS

Fatahalian, K., et al., "Reducing shading on GPUs using quad-fragment merging," published in ACM Transactions on Graphics (Proceedings of SIGGRAPH), vol. 29 (4) 2010 (8 pages).
Gribel, C.J., et al., "High-quality spatio-temporal rendering using semi-analytical visibility," published in ACM Transactions on Graphics (Proceedings of SIGGRAPH), vol. 30 (4), 2011 (11 pages).
Ragan-Kelley, J., et al., "Decoupled sampling for graphics pipelines," published in ACM Transactions on Graphics, vol. 30 (3) 2011 (17 pages).
Stoll, G., et al., "Razor: An architecture for dynamic multiresolution ray tracing," published as Technical Report RT-06-21, Dept. of Computer Science, University of Texas at Austin, 2006 (15 pages).
European Search Report issued in corresponding EP application No. 14180113.4-1502 dated Jan. 30, 2015, (8 pages).
Burns, C.A., et al., "A Lazy Object-Spaced Shading Architecture with Decoupled Sampling," in High Performance Graphics (2010) (10 pages). [Retrieved from the Internet on Jan. 20, 2015—URL:http://graphics.stanford.edu/~kayvonf/papers/burns_shading_hpg10.pdf].
Hou, Q., et al., "A Shading Reuise Method for Efficient Micropolygon Ray Tracing," ACM Transactions on Graphics, vol. 30, No. 6, 151 (2011) (7 pages). [Retrieved from the Internet on Jan. 20, 2015—URL:http://houqiming.net/res/shading-reuse-small.pdf].

\* cited by examiner

ADAPTIVE MULTI-FREQUENCY SHADING

CROSS-REFERENCE TO RELATED APPLICATION

This application is a non-provisional application that claims priority to provisional application Ser. No. 61/876,887 filed Sep. 12, 2013, hereby expressly incorporated by reference herein.

BACKGROUND

This relates generally to graphics processing.

In graphics processors and real-time applications, a large portion of the computational resources and power budget is spent on executing pixel shading on the programmable cores of the graphics processors. For over twenty years, the prevailing method has been multisampling antialiasing (MSAA), where shading is invoked once per triangle and pixel. The cost of pixel shading is therefore tightly coupled to both the geometric complexity and the screen resolution, and it has been necessary to keep both low.

This is in contrast to the developers' goal of providing a richer visual environment. Tessellation is an advantageous means to reach that goal, as it can provide highly detailed geometry without having to store and transfer huge polygonal meshes. However, tessellation also drastically increases the cost of pixel shading, currently limiting its applicability to high-end devices.

There is also a trend towards very high resolution displays in consumer and professional devices, motivated by the reduction of distracting aliasing. This further increases the amount of shading work.

BRIEF DESCRIPTION OF THE DRAWINGS

Some embodiments are described with respect to the following figures.

DETAILED DESCRIPTION

Figure 1:
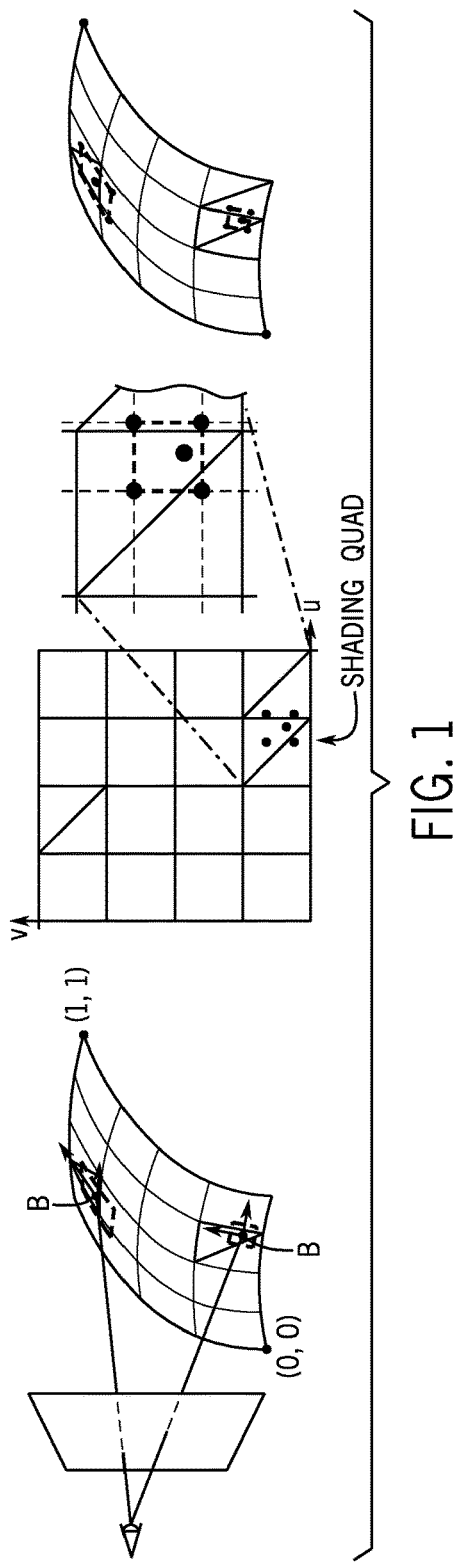
FIG. 1 is a depiction of pixel shading executed in parametric patch space rather than in screen-space according to one embodiment.

An architecture for pixel shading enables flexible control of shading rates and automatic shading reuse between triangles in tessellated primitives in some embodiments. The cost of pixel shading may then be decoupled from the geometric complexity. Wider use of tessellation and fine geometry may be made more feasible, even at very limited power budgets. Shading may be done over small local grids in parametric patch space, reusing shading for nearby samples. The decomposition of shaders into multiple parts is supported, which parts are shaded at different frequencies. Shading rates can be locally and adaptively controlled, in order to direct the computations to visually important areas and to provide performance scaling with a graceful degradation of quality. Another important benefit, in some embodiments, of shading in patch space is that it allows efficient rendering of distribution effects, which further closes the gap between real-time and offline rendering.

The pixel shading work may be largely independent of the level of tessellation and screen resolution. Pixel shading is decoupled from screen space; shading is lazily evaluated in parametric space defined over each higher-level input primitive, which may be a coarse patch but generally is any geometry composed of more than one input primitive. This means shading may be efficiently reused between all the triangles in a patch. The shading rate in parametric space need not be a priori determined, but instead in some embodiments may be locally and automatically adapted based on the final tessellated geometry. This avoids potential problems with under/over-shading and shading reuse across triangles with too different orientations within a patch. This method allows shading to always be performed at approximately the desired frequency in screen space, independent of the local curvature or displacement in some embodiments.

This architecture may also allow lazy shading and reuse simultaneously at multiple different frequencies. The pixel shading operations can, for example, be split into a low-frequency component that computes an approximate global illumination solution at a much lower rate than direct lighting. The cost of the lower-frequency computations is thus amortized over a larger screen-space region. Flexible control over the amount of pixel shading work may be enabled, independently of the geometry and display resolution. This allows an application to stay within a given frame time or power budget, while maximizing image quality.

In summary, features of some embodiments are:

(1) pixel shading is lazily (i.e. over a shading grid per patch) evaluated in patch-parametric space and reused between triangles in a patch;

(2) the shading resolution is automatically adapted based on the local geometry and user-defined/computed shading rates;

(3) shaders can be partitioned into multiple different components, which are shaded at different frequencies; and (4) the method integrates well into existing pipelines, and natively supports motion/defocus blur.

Pixel shading is executed in parametric higher-level primitive (e.g. patch) space rather than in screen space, as illustrated in FIG. 1. In the left depiction, shading requests are sent for the points B on two triangles in a patch, which are being rasterized. The sizes of the screen-space footprints on the surface are different for these two points due to the curvature. In the middle depiction one of the shading points is visualized in the patch's parametric (u, v)-space, and a shading quad of appropriate size is placed in its vicinity. In the right depiction, the four points forming shading quads are shown on the triangles of the patch. The shading points of a quad may map to other triangles.

While rasterizing each triangle in a tessellated patch, the rasterizer generates shading requests. These are answered by defining a small, local shading grid in patch (u, v)-space, over which shading is computed and cached for reuse. The scale and placement of the local shading grids may be automatically determined based on the local geometry and/or programmatic control. The local shading grids are not tied to the underlying tessellation, and may thus extend beyond the current triangle or over multiple triangles in a patch. In smooth regions, the grids tend to be similar and shading may be automatically reused between triangles. Where there is faster change, the local grids are more likely to differ in scale, which intuitively limits shading reuse in difficult regions.

Figure 2:
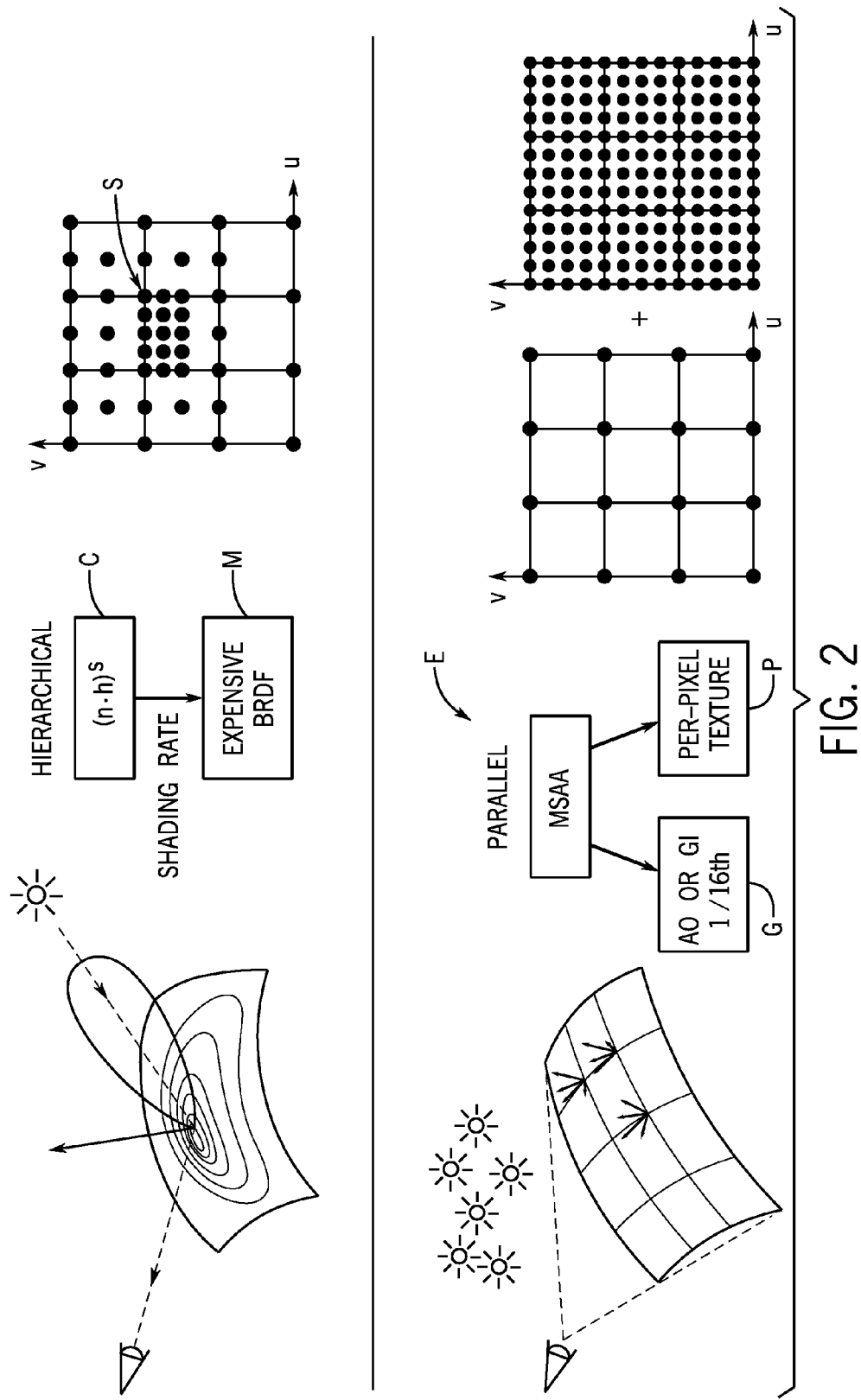
FIG. 2 is a depiction of two types of multi-frequency shading according to some embodiments.

One use case for this architecture is adaptive multi-frequency shading (AMFS) as shown in FIG. 2, giving two examples. In the top depiction, a hierarchical example may inexpensively compute a shading frequency that places more shading samples near the main lobe(s) of a reflection model. The top example shows how an inexpensive computation C can be used to control the shading frequency of a more expensive lighting model M, e.g., involving complex bidirectional reflectance distribution functions (BRDFs) or light scattering. In this case, more shading samples S are placed around the specular peak(s).

In the bottom depiction, parallel evaluation E is also possible, where a texture and diffuse shading is evaluated per pixel P, while ambient occlusion (AO) or global illumination (GI) can be computed at a much coarser granularity G. The bottom example shows how a shader can be run in parallel at multiple (in this case two) different frequencies G and P. The texture and diffuse shading is executed at per-pixel rate, while slowly-changing functions, such as indirect illumination, can be computed at a much lower rate (e.g., one shading sample per 4×4 grid points). Another possibility is to vary the shading rate spatially to allow high-definition shading centered around the viewing point. The total amount of shading work may be substantially reduced in these examples.

In some embodiments, head tracking is used to determine the main viewing point, in order to locally increase the shading rate in this area.

With a single fixed shading frequency (i.e., approximately once per pixel), (A(MF)S) multi-frequency (MF) capabilities are unused. Nevertheless, shading is in both cases effectively reused between the triangles in a patch, while the shading rate is adapted to the local geometry of the displaced/curved surface. The insertion/reuse of shading points happen automatically, without relying on a fixed shading grid.

Figure 3:
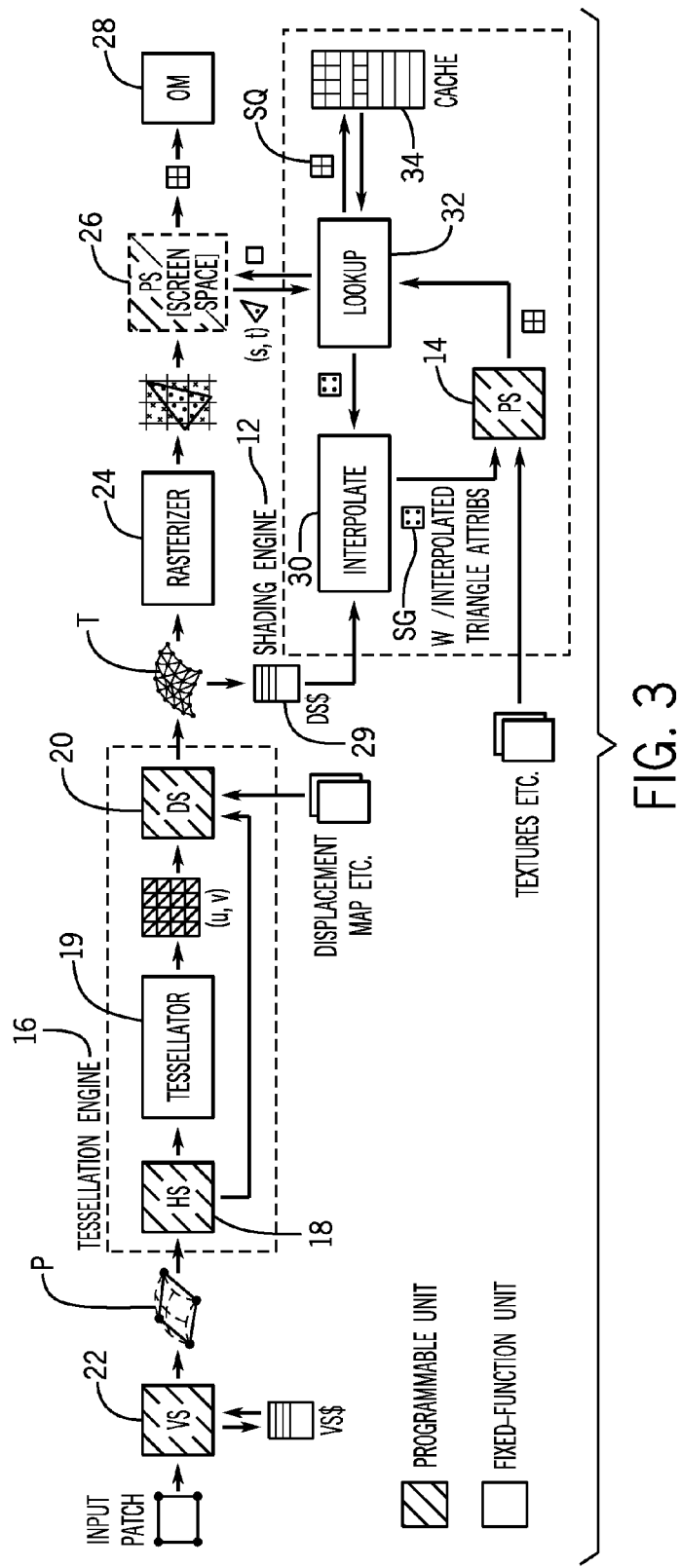
FIG. 3 is a depiction of a graphics pipeline with adaptive multi-frequency shading according to some embodiments.

FIG. 3 shows an architectural overview of one embodiment of a pipeline. The top row of units represent a traditional graphics processor supporting current application program interfaces (APIs), with the exception that pixel shading is now handled by a shading engine 12 operating in higher-level primitive (e.g. patch) space. At a high level, the shading engine is responsible for lazily evaluating and caching pixel shading 14, which is computed over the small local shading grids SG on the patch. Shading can thus be shared between, potentially, all the triangles in a patch. This is in contrast to current pipelines, which process triangles one-by-one and do not reuse pixel shading.

The tessellation engine 16 (in Direct3D 11 including hull (HS) 18 tessellator 19 and domain (DS) shader 20 stages), takes a patch (P) after vertex shading (VS) 22 as an input to generate a set of tessellated triangles T. The rasterizer 24 operates on one triangle at the time, and generates barycentric coordinates for each covered sample that pass a depth/stencil test (omitted). These may be shaded in a screen-space pixel shader (PS) 26 and written to the render target(s) by the output merger (OM) 28. However, the bulk of the shading work may be done in a new shading engine 12. Internally, a lookup unit 32 computes an appropriate small, local shading grid in patch space, and directly returns the shaded result if it is cached in the shading cache 34. Otherwise an interpolation unit 30 performs a patch-to-triangle lookup and fetches the relevant domain-shaded vertices through a domain shading cache (DS$) 29 to setup a shading quad (SQ). This shading quad is shaded by the (patch-space) pixel shader 14 and the result is cached and returned.

Assuming a single patch is in flight does not preclude an actual implementation from being deeply pipelined to handle multiple patches in parallel.

Current GPUs conceptually execute a pixel shader for each triangle and covered sample, or group of samples within a pixel (i.e., fragment) if multisampling antialiasing (MSAA) is enabled. In some embodiments, shading is instead computed by issuing shading requests to our shading engine, which ultimately returns the color of the requested sample or fragment. A shading request consists of the parametric position u=(u, v) on the patch at which to shade, along with its screen-space derivatives $u_x=\partial u/\partial x$ and $u_y=\partial u/\partial y$.

The parametric coordinates $u \in [0,1]^2$ (and u+v≤1 in case of triangular patches) represent a contiguous parameterization of the patch, which enables shading reuse. The derivatives define the extent and anisotropy of a screen-space pixel in patch space. Informally, the two 2D axes $u_x$ and $u_y$, describe the change in u when stepping one pixel in x and y, respectively. The rasterizer analytically computes these values by transforming the hit point on a rasterized triangle and its derivatives, from triangle barycentric space to patch space. This is an affine 2×3 transform, which is constant per triangle (see Appendix). Thus, the operations associated with issuing a shading request can often be performed in fixed-function hardware.

In some embodiments, an (optional) pixel shader 26 operating in screen space is responsible for issuing shading requests. The screen-space pixel shader may be used to support legacy applications, but also since certain operations benefit from knowing the exact screen-space position, it may be used to perform such screen-space dependent operation. Examples include frame buffer compositing, i.e., programmable blending, and read/write access to per-pixel data structures.

One embodiment makes it possible to implement multi-frequency shading by issuing several different shading requests, either in parallel or hierarchically, to compute partial results at different frequencies. For this purpose, a shader kernel identifier, k, may be used in the request. At each request, the issuing shader (screen-space or patch-space) may also apply an arbitrary scaling and/or translation of the shading point and its derivatives to locally adapt the shading density. In summary, the shading engine is formally responsible for evaluating f expressed as shown below:

$$\text{color}=f(k, u, \partial u/\partial x, \partial u/\partial y). \tag{1}$$

The screen-space shader (if used) runs at a rate of either once per sample, or once per fragment if MSAA is enabled, and thus issues shading requests at that rate.

The first step performed for each shading request is to compute an appropriate local shading grid in patch space. This is done by the unit labeled Lookup 32 in FIG. 3, the area of a pixel in patch space can be approximated as the area of the parallelogram spanned by $u_x$ and $u_y$:

$$A_{pixel} \approx |u_x \times u_y| = |u_x u_y - v_x u_y|. \tag{2}$$

Figure 4:
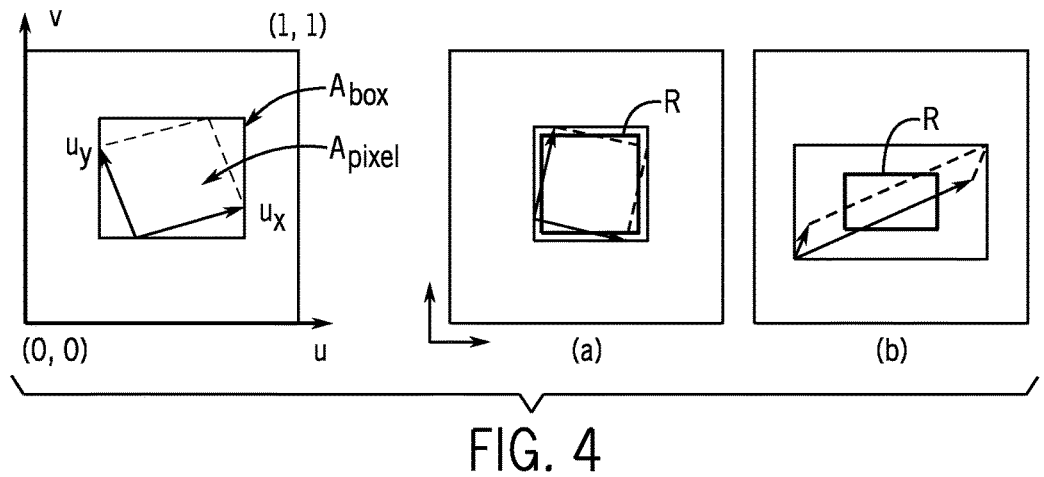
FIG. 4 is a depiction of axis-aligned target shading resolution according to one embodiment.

Based on this information, the patch may be divided into a (local) axis-aligned shading grid. In the canonical case, to reach a shading rate of approximately once per pixel, a target resolution of $r_u \times r_v$ grid points is chosen so that the area of a grid cell is equal to $A_{pixel}$ (FIG. 4). This computation is based on the bounding box of $u_x$ and $v_x$ (with area $A_{box}$) in patch space. The distortion due to the anisotropy and orientation of a patch may cause the grid points to lie significantly outside the pixel (FIG. 4(b)). To reduce this effect, the grid resolution is thus locally increased based on the ratio $\alpha = A_{box}/A_{pixel}$. FIG. 4(a) shows an example of low distortion, in which case none or very little correction is needed.

An axis-aligned target shading resolution is based on the bounds of the partial derivatives $u_x$ and $u_y$ scaled to pixel area (R). The ratio $\alpha = A_{box}/A_{pixel}$ measures the distortion between screen and patch space, which is some embodiments may be used to locally increase the shading rate. The most difficult case is anisotropically stretched and rotated patches.

Pixel shading may be executed and cached at the granularity of a shading quad, i.e., 2×2 grid points, in order to support shader derivatives through finite differences. Multiple such shading quads may be buffered and shaded together. If subsequent shading requests map to the same shading quad and the same grid resolution, the previously computed results may be reused, as described below. It is thus advantageous that the number of unique grid resolutions is limited, as otherwise no reuse would occur. The grid resolution $(r_u, r_v)$ may be quantized to power-of-twos independently along each dimension, to provide a discrete set of grid resolutions, but still to some extent respect the aspect ratio of the target resolution. The final quantized shading grid resolution is denoted $n = (n_u, n_v)$ below.

The values of n correspond to the final shading rate. The rate varies around once per pixel due to the local geometry. Since the shading grid computation is performed locally for each shading request, a patch may be shaded at different rates in different regions. At each transition in grid resolutions, some over-shading may occur. However, the effect is limited compared to using a single per-patch shading grid resolution, which has to be conservatively chosen based on the most detailed region. The shading rate may be automatically adapted to fit the local displaced geometry.

So a canonical case of shading around once per pixel has been described. To vary this rate, the user can scale the input derivatives that drive the computation. For example, using $\kappa(u_x, u_y)$, the system shades approximately once per $\kappa \times \kappa$ pixels. Note that $\kappa$ does not have to be an integer, and that it may be varied spatially and independently along the two axes. In one implementation, multi-frequency shading is exposed through the function:

shade2D(k,u,dudx,dudy)

where k is the shader kernel. The value of u and its derivatives dudx and dudy are supplied to the shader as system-generated values.

Shading may be lazily executed and cached, with both nearest neighbor and bilinearly filtered lookups. In the former case, a single cache query is performed and the resulting color is returned, while in the latter, four cache queries are issued. It would be possible to extend this mechanism to higher-order filtering schemes such as trilinear and anistropic filtering. However, simple nearest-neighbor lookups often give sufficiently good results at shading rates greater than one, while using bilinear filtering for downsampled shading (when $\kappa > 1$).

To perform a cache query, the shading point u is placed at the nearest grid point p at the computed quantized grid resolution n, or nearest four points $p_{i,j}$, where $i,j \in \{0,1\}$, if bilinear interpolation is used. For each such quantized shading point, the index of the shading quad q that it belongs to is first computed (through simple bit shifts), and then a shading cache lookup is done using the key:

$$\text{key} = h(k, q, n), \qquad (3)$$

where h is an appropriately chosen hash function. The shading cache is a memoization cache. In Equation 3, i.e., the shader kernel ID k and the quantized grid resolution n are included in the tag. Cache records are evicted from the shading cache only when a patch is done or when the cache is full.

Whenever a requested shading quad does not already exist in the cache, it will be shaded. In this case, the system first performs attribute interpolation, before the shading quad is put in the queue for pixel shading. The interpolants are attributes output by the domain shader, e.g., position, texture coordinates, normals etc., which are fed to the pixel shader as inputs. The associated operations are performed in the interpolate unit 30 in FIG. 3.

The position and other attributes of each vertex in a tessellated patch are computed by executing (using Direct3D nomenclature) hull and domain shaders, which have knowledge about the patch's shape, topology and corners. Prior to pixel shading, each shading quad has to be filled in with interpolated attributes at each of its shading points (one indicated as R) in FIG. 5. There are several options: (I) interpolate directly from the patch's corners, (II) re-execute the domain shader (DS) at the shading point to evaluate its attributes based on the continuous patch, and (III) interpolate between the already domain-shaded vertices.

Figure 5:
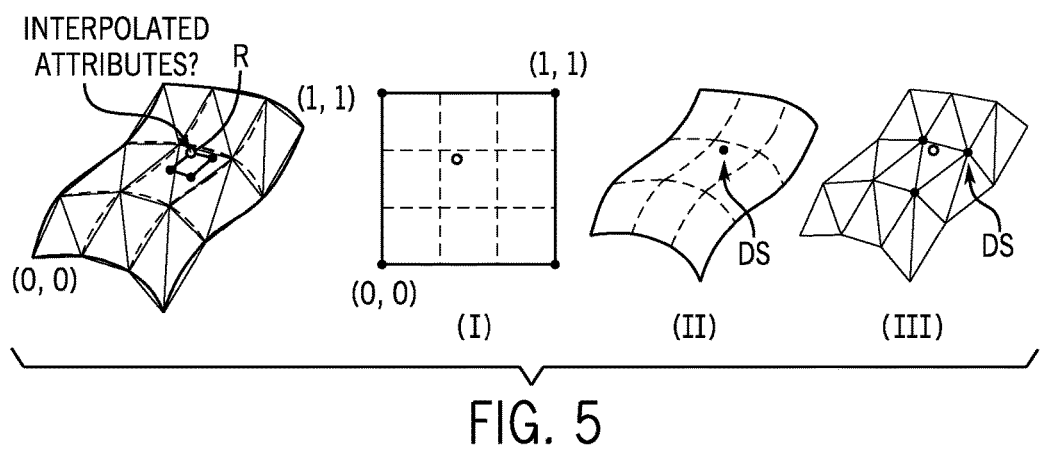
FIG. 5 is a depiction of three strategies for interpolating attributes according to some embodiments.

In the traditional pipeline, attributes are interpolated in the plane of each triangle using the barycentric coordinates of each shading point. Things are more complicated in patch space, since a shading quad may overlap many different triangles. FIG. 5 illustrates a few different strategies. Interpolating from the patch corners (I) is rarely useful as it does not consider the shape of the patch. At the other end of the scale (II), one can evaluate the underlying continuous surface. This essentially involves (re-)executing the domain shader (DS) 20 (FIG. 3), or a subset of it, at each shading point, which is costly. Another problem is the discrepancy between the continuous surface and the rasterized triangulated surface. At larger than subpixel-sized triangles this can be significant. Therefore, attributes may be interpolated (III) over the final triangulated patch, which will be described below. This may avoid extra DS invocations. However, the user may still manually perform I or II in shader code.

The input to the interpolation unit is a quad with associated (u, v) coordinates. The unit also gets information from the tessellator about the currently used tessellation rates and scheme. To evaluate the interpolants at a point u, the interpolate unit starts by locating the triangle in which the point falls. Then barycentric interpolation between its three vertices is performed. The task at hand is thus to perform a mapping P: $(u, v) \rightarrow (j, s, t)$, where j is the triangle-in-patch index and $(1-s-t, s, t)$ are the barycentric coordinates in that triangle. The attributes are then interpolated as follows:

$$a(u, v) = \frac{1}{|P|}(1 - s - t)a_0^j + sa_1^j + ta_2^j, \qquad (4)$$

where $a_i^j$ are the attributes of triangle j at the vertices $i \in \{0,1,2\}$. These are fetched from the domain shading cache (DS$) 29 of FIG. 3, which operates the same way as a traditional vertex cache. The capacity N necessary for good reuse depends on many factors, including the ordering of triangles within the patch, its access patterns, and so on. A modest value of N=64 vertices is often sufficient, even at high tessellation rates.

In its most general form, the lookup function P can be implemented by traversing a 2D accelleration structure in (u, v)-space, such as a grid or quad tree, which is built once per rendered patch. While such a strategy always works, it is unneccessarily costly if the tessellator and interpolation unit are properly co-designed.

With uniform tessellation, the triangle index j can—with knowledge of the tessellator's triangle output order and split diagonal—trivially be found by quantizing u to the tessellation grid, and inverting the space-filling curve along which triangles are output. This can, in most cases, be done using simple bit operations. In Direct3D 11, both uniform and non-uniform tessellation are relatively easily supported, although the latter is slightly more involved. With the non-uniform pattern, each patch edge has its own tessellation factor, which means there will be an interior regular region and a border with stitched triangles. The interior is trivial, and for the border, we can locate the relevant section and do a few specialized 2D point-in-triangle tests.

Once the triangle j has been found, the point's parametric coordinates (u, v) are transformed to triangle barycentrics using the inverse of the affine transform in Equation 7 in the Appendix, at a cost of 4 multiply-accumulate (MADD) operations.

In some embodiments, triangle vertices are indexed by their domain points u,v when accessing the domain shading cache. In this case, finding the triangle index j may not be necessary, if the domain points for the relevant triangle can be directly computed.

The input to the pixel shader unit (the bottom unit labeled PS 14 in FIG. 3) is a shading quad with pre-interpolated vertex attributes. This is very similar to the traditional graphics pipeline. The main difference is that the attributes are now interpolated from potentially different triangles. Finite differencing over the locally regular shading grids may be used to approximate shader derivatives, e.g., for texture filtering. These may be expressed as patch-space gradients, ddu, analogous to ddx/ddy in screen-space shading methods.

In one embodiment, the PS unit also receives a kernel ID, k, that specifies which specific pixel shader program to execute for a given shading quad. For full flexibility, different shader kernels may run simultaneously. This is a step away from current graphics APIs, which execute the same pixel shador for all geometry in a draw call. To support a more flexible execution model, one may assume bindless shader resources. Instead of relying on a fixed set of resource bind slots for constant buffers, textures, samplers, and so one, the shader kernel is selfcontained and accesses its resources through handles that refer to resource descriptors allocated in graphics memory. A bindless execution model is a logical next step, as it has clear benefits also from a usability point of view.

Once the shader kernel finishes execution, the results may be stored in the shading cache 34 (FIG. 3) and returned to the caller. The caller may in this case be another patch-space kernel, a screen-space pixel shader 26, or a fixed-function unit requesting a shading.

A modern graphics processor has multiple physical shader cores, each running a large number of logical threads (contexts), in order to hide latencies due to memory stalls etc. The dedicated register file is a finite resource that effectively limits the number of simultaneous threads. For good utilization, each execution core receives enough work to keep it busy. Consequently, the hardware handles a large number of simultaneous shading quads and uses a good load balancing strategy for work distribution. Also, mechanisms handle out-of-order retirement of shading quads, even though tessellation allows for some freedom since the triangle ordering within a patch is not strictly specified, but it may be consistent from frame to frame.

Whereas the rasterizer is normally responsible for generating a steady stream of shading quads, the majority of the shading work is, in one embodiment, generated at misses in the shading cache. Hence the total amount of work is expected to be smaller than before, although the shading quads are generated in a more unpredictable fashion. The architecture can also support hierarchical multi-frequency shading, which introduces dependencies between the shading quads To handle this more difficult scheduling problem, a distributed task-based scheduling system may be used. Each execution of a shader kernel for a particular shading quad is a task. Whenever a kernel issues a shading request that cannot be immediately answered, a new task is generated. In this case, the original kernel has a dependency on the newly added task to finish before it can proceed.

Figure 6:
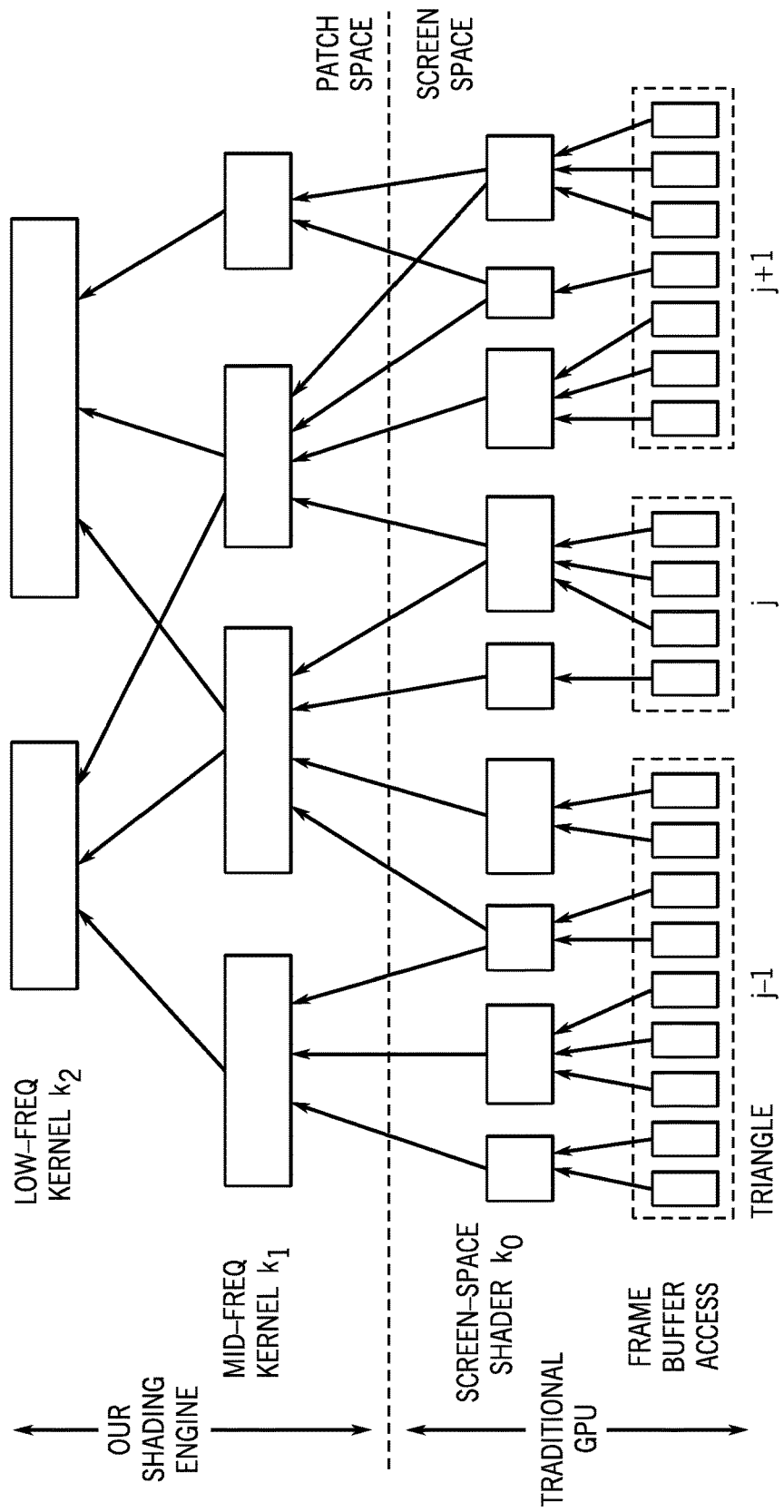
FIG. 6 is an example of a task graph for multi-frequency shading according to some embodiments.

FIG. 6 shows an example of a possible task graph, with arrows depicting dependencies between tasks. The task graph in the example has both a screen-space pixel shader $k_0$, and two different patch-space shader kernels $k_1$ and $k_2$, respectively, where $k_2$ runs at a lower frequency than $k_1$. The traditional real-time graphics pipeline implements the lower half of the graph, i.e., screen-space shading, while we add patch-space shading (upper half).

The simulated architecture is specified by a number of execution cores, a fixed number of execution contexts, and a memory hierarchy defined by cache hit-ratios and latencies, and a final memory latency. Variation analysis may be used to understand the simplification of using a fixed number of execution contexts. Simulation of execution may be performed cycle-by-cycle, taking into account memory stalls according to a randomized analytical model based on cache hit-ratios and latencies. Memory accesses occur with even probability throughout the execution of a task.

In a conventional GPU, shading tasks stall mainly on memory accesses, while GPUs according to some embodiments may also stall on other shading tasks. The main limiting factor can then be the number of stalled tasks waiting for other shading work to finish, since these consume valuable register space. It is thus advantageous that tasks with many dependents finish early, and are given a high priority by the scheduling algorithm. When multiple tasks are ready for execution, i.e., they have no outstanding dependencies and have acquired a context, they are thus first prioritized on the number of outstanding dependents, and thereafter according to an oldest job first policy. While stalled, tasks still occupy contexts, which are returned only on task completion in some embodiments.

To reach a higher level of visual fidelity, while staying within the power envelope of modern graphics devices, the cost of pixel shading may be reduced. These goals may be achieved by shading in parametric patch space, thereby largely decoupling the cost of pixel shading from the geometric complexity. This allows developers to add fine geometric detail where needed, without severely increasing the number of pixel shader executions. The cost of pixel shading may be reduced by locally or globally reduce the shading rates for computations that can be performed at lower frequencies than once per pixel or sample. This flexibility allows a smooth degradation of image quality at increased performance, something that is desirable in order to keep a constant frame rate in real-time applications.

In conclusion, by reducing the cost of pixel shading with advanced rendering techniques such as subdivision surfaces and/or stochastic rasterization the quality gap between offline rendering and real-time graphics may be narrowed.

Figure 7:
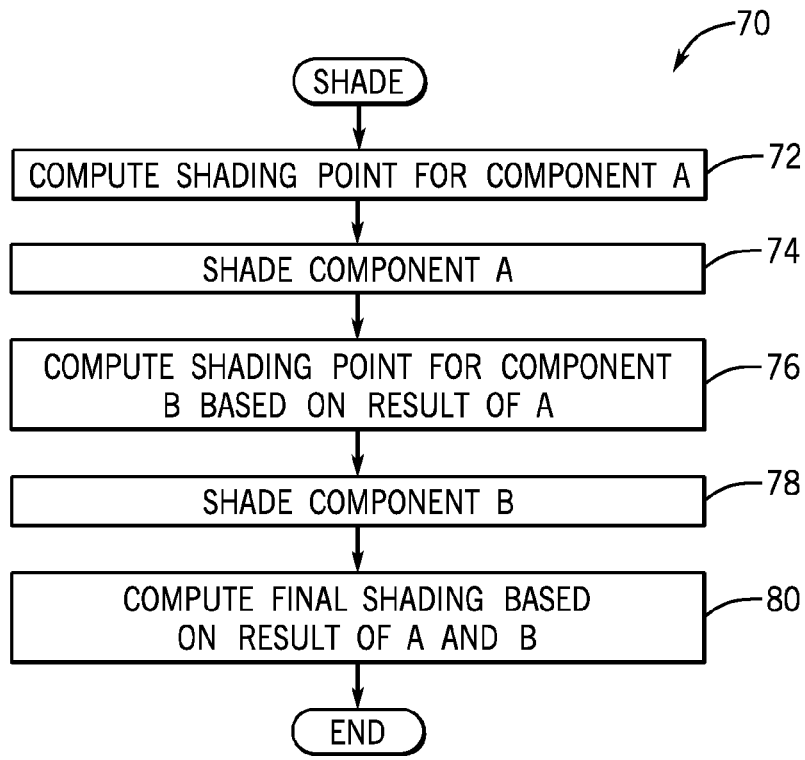
FIG. 7 is a flow chart for one embodiment.

Referring to FIG. 7, a sequence 70 for multi-frequency shading may be implemented in software, firmware and/or hardware. In software and firmware embodiments it may be implemented by computer executed instructions stored in one or more non-transitory computer readable media such as magnetic, optical, or semiconductor storages.

The shading may be decomposed into multiple different components, which are each computed in its own shading space and/or local shading grid. Shading requests may be performed sequentially, where the result of one request can be used to determine the local shading grid for subsequent requests. This allows, for example, a bottom-up shading computation, where the result of an inexpensive, high frequency shading computation is used to compute an appropriate lower-frequency rate at which to perform more expensive but lower frequency shading. Multiple independent requests may be processed in parallel to improve performance.

The sequence may begin by computing the shading point for component A as indicated in block 72. Then the component A is shaded as indicated in block 74. Next the shading point for component B is computed based on the result of A as indicated in block 76. In block 78 the component B is shaded. Then in block 80 the final shading is computed based on the results of A and B. Thus the results of shader computation A is used to compute an appropriate shading point and lower resolution local shading grid for computation B. In this case, many unique shading instances compute the same shading point for component B, and shading reuse occurs due to lazy evaluation and caching.

Figure 8:
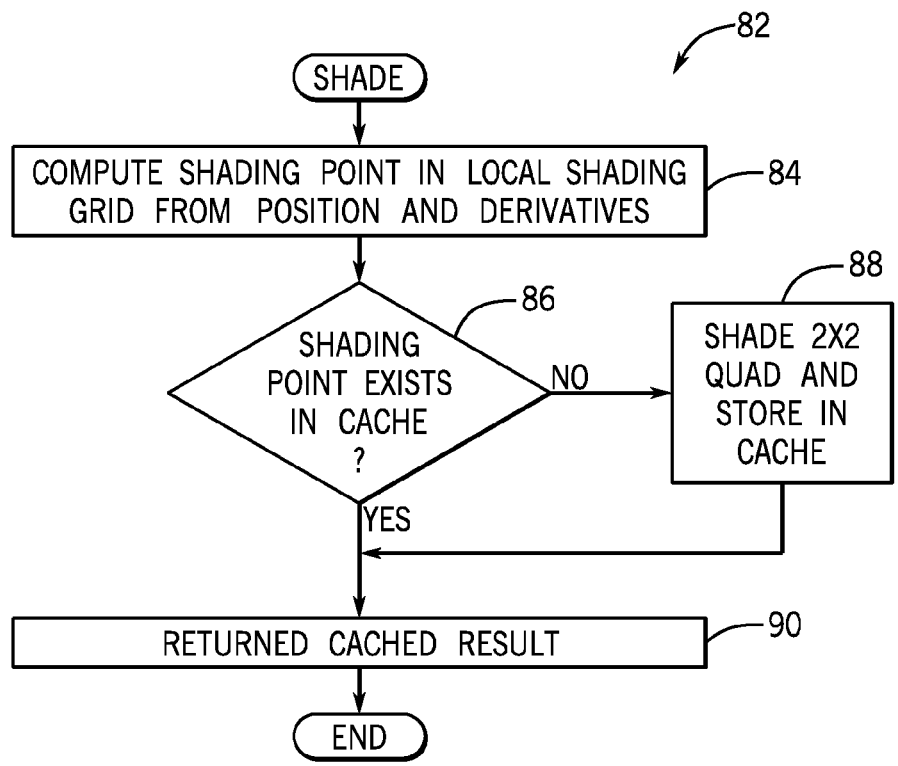
FIG. 8 is a flow chart for another embodiment.

Referring to FIG. 8, a sequence 82 in accordance with another embodiment may be implemented in software, firmware and/or hardware. In software and firmware embodiments it may be implemented by computer executed instructions stored in one or more non-transitory computer readable media such as magnetic, semiconductor or optical storage.

The sequence 82 begins by computing the shading point in a local shading grid from position and derivatives as indicated in block 84. Then a check at diamond 86 determines whether the shading point exists in the cache. If not a 2×2 quad is shaded and stored in the cache as indicated in block 88. Otherwise, the cached result is returned as indicated in block 90. In this case, the shading grid is not predetermined, but locally computed based on the current position and derivatives. Other implementations include buffering and/or sorting to extract coherence.

Appendix/Parametric Patch Space

For each shading request, the patch-parametric coordinates u=(u, v) and their screen-space derivatives are computed. This computation may be done analytically by evaluating the quantities on the current triangle, and then mapping the result to patch space. Let (1−s−t, s, t) be barycentric coordinates on a triangle. Perspective-correct interpolation of s=(s, t) at a screen-space position (x, y) is expressed as:

$$s(x, y) = \frac{\frac{s}{w}(x, y)}{\frac{1}{w}(x, y)} = \frac{a_s x + b_s y + c_s}{a_1 x + b_1 y + c_1}, \tag{5}$$

where the interpolation coefficients ($a_i$, $b_i$, $c_i$) are constant over the triangle and are computed in the setup (for non-stochastic rasterization). The partial derivatives of s with respect to screen-space position follows from differentiation of Equation (5):

$$s_x = \frac{\partial s}{\partial x}(x, y) = \ldots = (a_s - a_1 s(x, y))w(x, y), \tag{6}$$

with a similar expression for $s_y$, and using $$w = 1 \Big/ \frac{1}{w}.$$

Note that the rasterizer already computes the hit point s (and hence w), so the added cost is one MADD operation per derivative (four in total).

Given the patch-parametric coordinates (i.e., the domain points) of the current triangle's three vertices, $\vec{u}_0, \vec{u}_1, \vec{u}_2$, which are computed by the tessellator, the transform from triangle to patch space is given by the affine 2×3 matrix:

$$M = \begin{bmatrix} u_1 - u_0 & u_2 - u_0 & u_0 \\ v_1 - v_0 & v_2 - v_0 & v_0 \end{bmatrix}, \tag{7}$$

where the shading point is transformed as $\vec{u}=M\cdot(s,t,1)^T$, and the derivatives are transformed as vectors, e.g., $\vec{u}_x=\partial \vec{u}/\partial x=M\cdot(\partial \vec{s}/\partial x,0)^T$ and similar for $\vec{u}_y$. In the general case, these three transforms carry a total cost of 12 MADDs (which can be performed in fixed-point arithmetic). For certain tessellation schemes, e.g., uniform tessellation, faster special cases may also be implemented.

When stochastic rasterization is used, the triangle vertices are functions of the time/lens position. In this case, we choose to compute exact derivatives at each sample's location in 5D space. This is slightly more involved since we cannot rely on precomputed interpolation coefficients.

Figure 9:
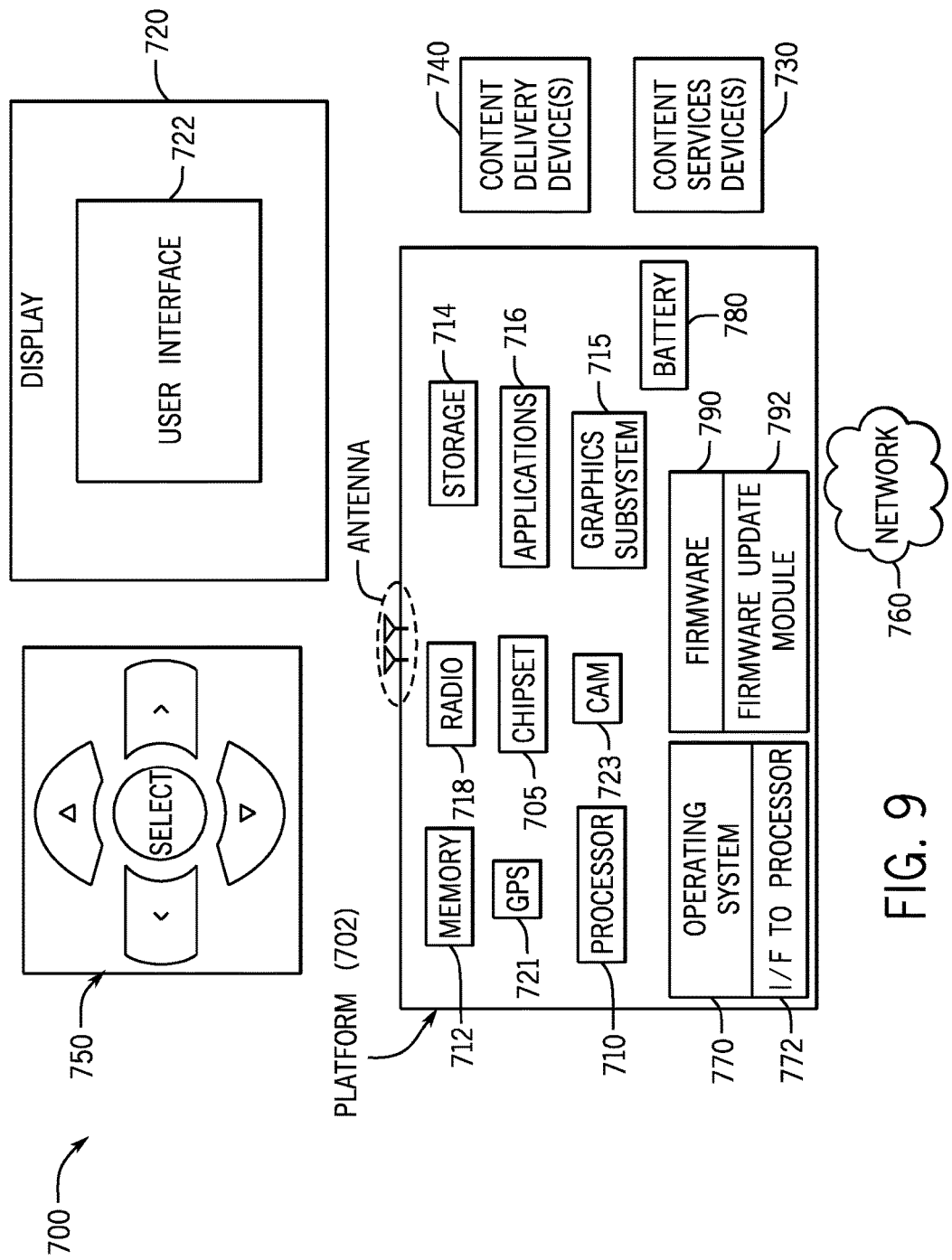
FIG. 9 is a system depiction for one embodiment.

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 8 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
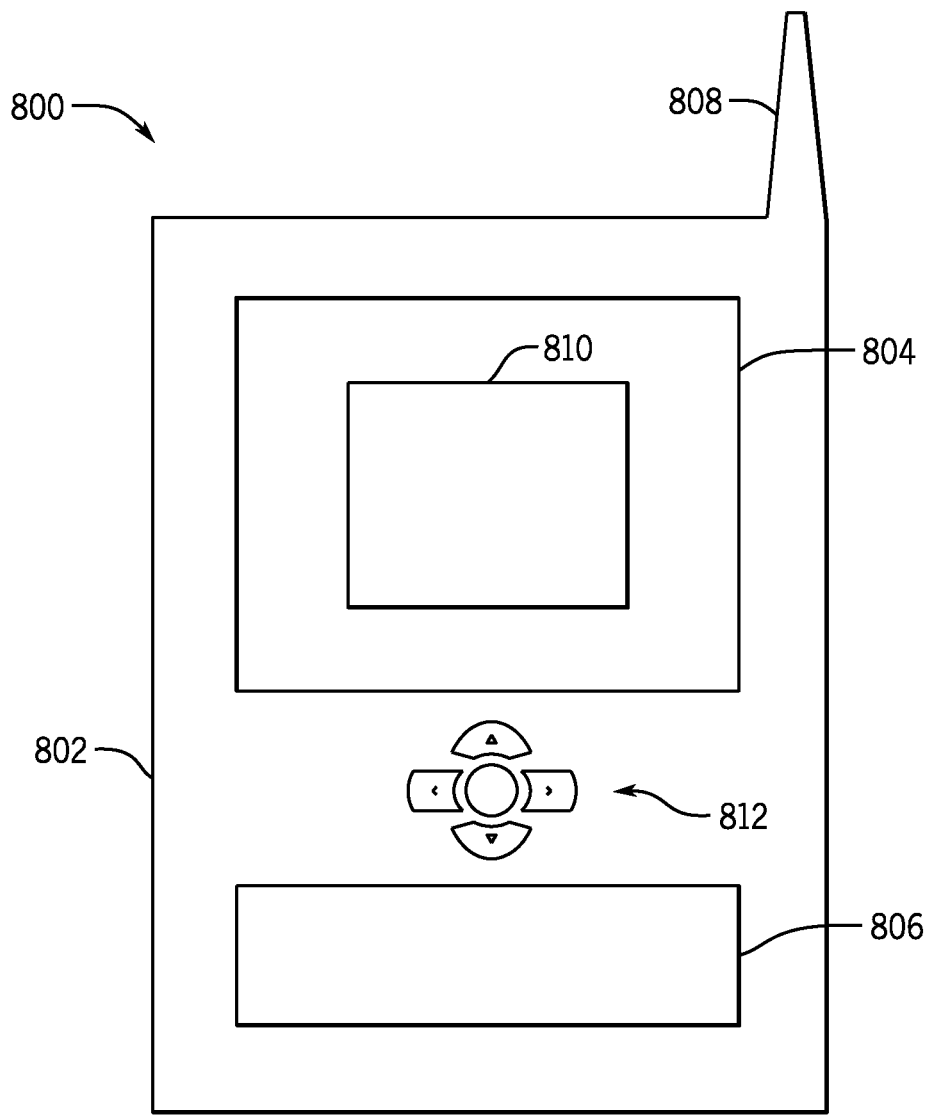
FIG. 10 is a front elevational view of one embodiment in accordance with FIG. 9.

As described above, system 700 may be embodied in varying physical styles or form factors. FIG. 10 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 8 in software and/or firmware embodiments.

As shown in FIG. 10, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising evaluating, in a graphics processor, pixel shading in parametric space over a higher-level input primitive, and re-using pixel shading between primitives making up the higher-level input primitive. The method may also include automatically adapting shading resolution based on local geometry and user based shading rates. The method may also include partitioning shaders into multiple different components, each component shaded at a different frequency. The method may also include generating in a rasterizer shading requests and defining a local grid in parametric space over which shading is computed and cached for reuse. The method may also include hierarchically evaluating shading components based on the result of previously computed components. The method may also include wherein said shading request includes a parametric position on the higher-level primitive at which to shade together with screen space derivatives. The method may also include using an identifier in each request and using different shading requests to compute partial results at different frequencies. The method may also include returning an already shaded result if cached and otherwise setting up a shading quad with attributes and performing pixel shading. The method may also include interpolating attributes from previously executed shaders. The method may also include using tessellation and performing a higher level primitive-to-triangle look up and fetching already domain-shaded vertices through a cache.

Another example embodiment may be one or more computer readable media storing instructions executable by a processor to perform a sequence comprising evaluating pixel shading in parametric space over a higher-level input primitive, and re-using pixel shading between primitives making up the higher-level input primitive. The media may include said sequence including automatically adapting shading resolution based on local geometry and user based shading rates. The media may include said sequence including partitioning shaders into multiple different components, each component shaded at a different frequency. The media may include said sequence including generating in a rasterizer shading requests and defining a local grid in parametric space over which shading is computed and cached for reuse. The media may include said sequence including hierarchically evaluating shading components based on the result of previously computed components. The media may include wherein said shading request includes a parametric position on the higher-level primitive at which to shade together with screen space derivatives. The media may include said sequence including using an identifier in each request and using different shading requests to compute partial results at different frequencies. The media may include said sequence including returning an already shaded result if cached and otherwise setting up a shading quad with attributes and performing pixel shading. The media may include said sequence including interpolating attributes from previously executed shaders. The media may include said sequence including using tessellation and performing a higher level primitive-to-triangle look up and fetching already domain-shaded vertices through a cache.

In another example embodiment may be an apparatus comprising a processor to evaluate pixel shading in parametric space over a higher-level input primitive and re-use pixel shading between primitives making up the higher-level input primitive, and a memory coupled to said processor. The apparatus may include said processor to automatically adapt shading resolution based on local geometry and user based shading rates. The apparatus may include said processor to partition shaders into multiple different components, each component shaded at a different frequency. The apparatus may include said processor to generate in a rasterizer shading requests and define a local grid in parametric space over which shading is computed and cached for reuse. The apparatus may include said processor to hierarchically evaluate shading components based on the result of previously computed components. The apparatus may include wherein said shading request includes a parametric position on the higher-level primitive at which to shade together with screen space derivatives. The apparatus may include said processor to use an identifier in each request and use different shading requests to compute partial results at different frequencies. The apparatus may include a display communicatively coupled to the processor. The apparatus may include a battery coupled to the processor. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
evaluating, in a graphics processor, pixel shading in a parametric space;
generating rasterizer shading requests, wherein each of the rasterizer shading requests defines a local grid over a higher level primitive in the parametric space over which shading is computed and cached for reuse between primitives within the higher level primitive, and wherein the higher level primitive has been tessellated into a plurality of lower level primitives,
wherein the each rasterizer shading request includes a parametric position on the higher-level primitive and screen space derivatives corresponding to the parametric position;
using said parametric position and said screen space derivatives at said parametric position to compute the local grid for shading; and
partitioning shaders in the graphics processor to simultaneously implement shading at different frequencies for different local grids, said frequencies determined locally and automatically for each of said local grids based on final tessellated geometry and one of more of the rasterizer shading requests.

2. The method of claim 1 including automatically adapting shading resolution based on local geometry and user based shading rates.

3. The method of claim 1 including hierarchically evaluating shading components based on the result of previously computed components.

4. The method of claim 1 including using an identifier in each shading request and using different shading requests to compute partial results at different frequencies.

5. The method of claim 1 including returning an already shaded result if cached and otherwise setting up a shading quad with attributes and performing pixel shading.

6. The method of claim 5 including interpolating attributes from previously executed shaders.

7. The method of claim 6 including using tessellation and performing a higher level primitive-to-triangle look up and fetching already domain-shaded vertices through a cache.

8. One or more non-transitory computer readable media storing instructions executable by a processor to perform a sequence comprising:
evaluating, in a graphics processor, pixel shading in a parametric space;
generating rasterizer shading requests, wherein each of the rasterizer shading requests defines a local grid over a higher level primitive, in the parametric space over which shading is computed and cached for reuse between primitives within the higher level primitive, and wherein the higher level primitive has been tessellated into a plurality of lower level primitives, wherein the each rasterizer shading request includes a parametric position on the higher-level primitive and screen space derivatives corresponding to the parametric position;

using said parametric position and said screen space derivatives at said parametric position to compute the local grid for shading; and partitioning shaders in the graphics processor to simultaneously implement shading at different frequencies for different local grids, said frequencies determined locally and automatically for each of said local grids based on final tessellated geometry and one of more of the rasterizer shading requests.

9. The media of claim 8 said sequence including automatically adapting shading resolution based on local geometry.

10. The media of claim 8 said sequence including hierarchically evaluating shading components based on the result of previously computed components.

11. The media of claim 8 said sequence including using an identifier in each shading request and using different shading requests to compute partial results at different frequencies.

12. The media of claim 8 said sequence including returning an already shaded result if cached and otherwise setting up a shading quad with attributes and performing pixel shading.

13. The media of claim 12 said sequence including interpolating attributes from previously executed shaders.

14. The media of claim 13 said sequence including using tessellation and performing a higher level primitive-to-triangle look up and fetching already domain-shaded vertices through a cache.

15. An apparatus comprising:
a processor to evaluate pixel shading in a parametric space, generate rasterizer shading requests, wherein each of the rasterizer shading requests defines a local grid over a higher level primitive, in the parametric space over which shading is computed and cached for reuse between primitives within the higher level primitive, and wherein the higher level primitive has been tessellated into a plurality of lower level primitives, wherein the each rasterizer shading request includes a parametric position on the higher-level primitive and screen space derivatives corresponding to the parametric position, use said parametric position and said screen space derivatives at said parametric position to compute the local grid for shading and, partition shaders in the graphics processor to simultaneously implement shading at different frequencies for different local grids, said frequencies determined locally and automatically for each of said local grids based on final tessellated geometry and one of more of the rasterizer shading requests; and a memory coupled to said processor.

16. The apparatus of claim 15, said processor to automatically adapt shading resolution based on local geometry.

17. The apparatus of claim 15, said processor to hierarchically evaluate shading components based on the result of previously computed components.

18. The apparatus of claim 15 wherein said shading request includes a parametric position on the higher-level primitive at which to shade together with screen space derivatives.

19. The apparatus of claim 15, said processor to use an identifier in each shading request and use different shading requests to compute partial results at different frequencies.

20. The apparatus of claim 15 including a display communicatively coupled to the processor.

21. The apparatus of claim 15 including a battery coupled to the processor.

22. The apparatus of claim 15 including firmware and a module to update said firmware.

* * * * *